May 13, 1941.                A. ALFORD                  2,241,897
              VARIABLE FREQUENCY RADIO BEACON
                  Filed Oct. 11, 1939          3 Sheets-Sheet 1
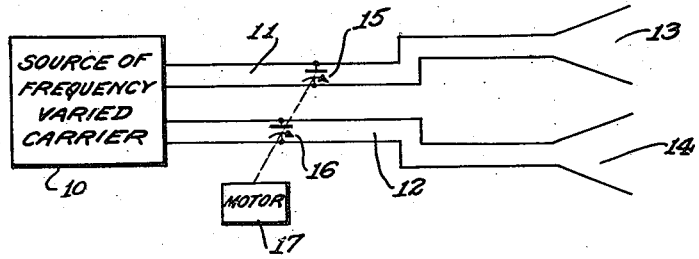
FIG. 1.
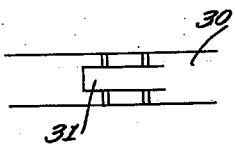
FIG. 3.
FIG. 2.
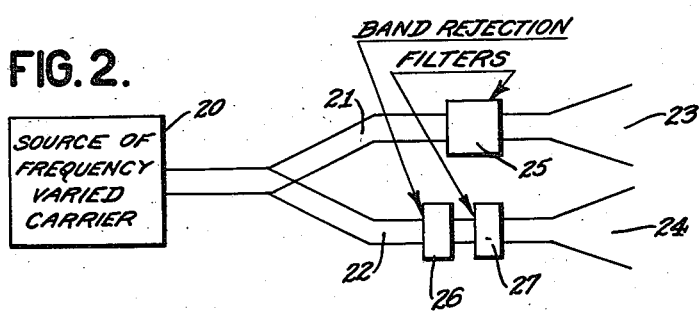
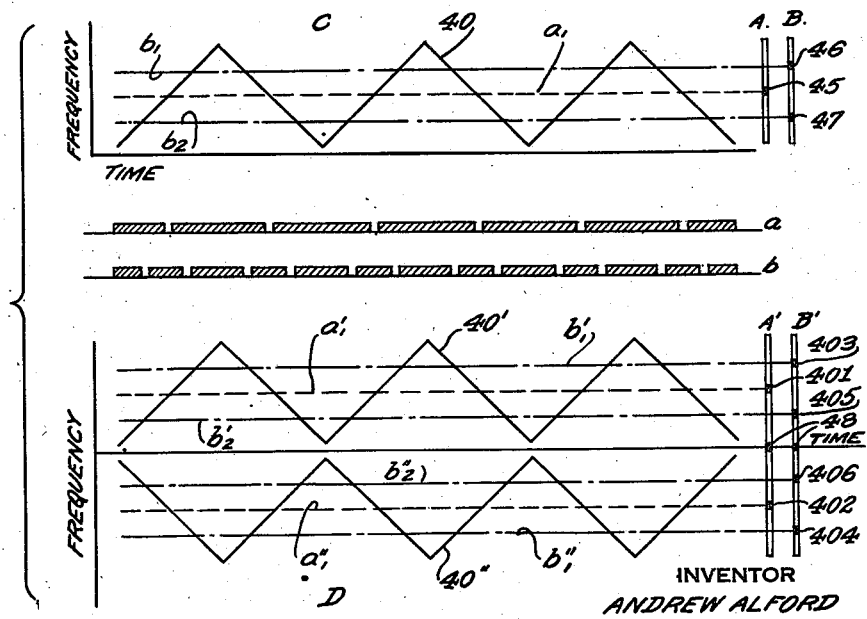
FIG. 4.
INVENTOR
ANDREW ALFORD
BY
ATTORNEY

INVENTOR
ANDREW ALFORD
BY
ATTORNEY

May 13, 1941.  A. ALFORD  2,241,897
VARIABLE FREQUENCY RADIO BEACON
Filed Oct. 11, 1939  3 Sheets-Sheet 3

INVENTOR
ANDREW ALFORD
BY
ATTORNEY

Patented May 13, 1941

2,241,897

UNITED STATES PATENT OFFICE 2,241,897

VARIABLE FREQUENCY RADIO BEACON

Andrew Alford, New York, N. Y., assignor to International Telephone Development Co. Inc., New York, N. Y., a corporation of Delaware Application October 11, 1939, Serial No. 298,903

17 Claims. (Cl. 250—11)

My invention relates to radio beacons and more particularly to ultra-high frequency radio beacons using a variable frequency carrier.

One of the most troublesome phenomena affecting radio beacons particularly when using frequencies in the ultra-high frequency range is that which may be termed "scalloping." This scalloping is caused by the superposition of the radiation patterns of waves reflected from various objects in the field of radiation of the beacon and the radiation pattern of the beacon itself. Although in general the radiation pattern of the beacon itself may be smooth, the radiation pattern of waves reflected from various objects in the field of the radiation produces a great number of irregularities. When the direct pattern and the reflected pattern, are superposed there results a pattern which has a great number of minima and maxima and which at times may be so wavy that in the receiver on a rapidly moving plane the signal appears to be modulated.

Furthermore, a course defined by the intersection of two scalloped patterns may be very wavy or may be composed of a plurality of multiplicity of course indications caused by the production of several intersections of the waves due to the wavy radiation pattern. These so-called multiple or false courses may appear and disappear as the plane travels along the course and lead the pilot astray.

As a rule the higher the frequency the greater the amplitude of waves reflected from the smaller objects and consequently the greater is the effect of scalloping. Accordingly, at frequencies in the neighborhood of 125 megacycles there is generally more trouble from this source than at lower frequencies, for example in the neighborhood of 60 megacycles.

According to my invention this troublesome phenomenon may be greatly reduced or substantially eliminated by arranging the transmitter system so that the frequency of the carrier of the beacon is varied over a considerable range. If the frequency of the carrier is varied or wobbled the phases of the reflected waves at any given point in space will vary differently from the phases of the direct waves and the total pattern as perceived by the instruments on the craft being guided will be the average pattern obtained by averaging over the complete cycle of frequency modulation. The greater the difference in path between the direct and reflected waves the closer will this average pattern approach the undistorted pattern radiated by the beacon itself. The percentage change in frequency to accomplish this result need not be high, a frequency variation of, for example ½ of 1% or of 1% being sufficient for the purpose. The higher the carrier frequency the better the results obtained with the same percentage frequency variation or modulation because a given difference in actual length of the two geometrical paths includes a greater number of wavelengths as the frequency is increased.

According to one feature of my invention carrier frequency in modulated frequency may be transmitted from two directive antennae arranged to produce overlapping radiation patterns and the radiation from each antennae may be given a characteristic amplitude modulation for distinguishing and comparing the patterns on the craft.

According to another feature of my invention the discrimination between the radiations from separate directive antennae may be obtained by use of band rejection filters arranged in the feeding paths of the separate antennae, the number of band rejection filters being different in the paths of the two antennae so as to impart a different characteristic amplitude modulation to the radiations.

According to a still further feature of my invention the frequency variation of the carrier may be produced by amplitude modulating a fixed carrier frequency with a variable frequency auxiliary oscillation to produce two side bands each of which vary in frequency between fixed limits determined by the auxiliary oscillator. These side bands may be both radiated with or without the carrier from the antennae of the beacon and may be given separate identifying characteristics by modulation arrangements of suitable form, or the side bands may be of such frequency as to produce side bands easily separated by filters.

In the latter case the carrier and one side band may be radiated from one antenna of the beacon while the carrier and the other side band is radiated from the other antenna, the discrimination between the radiated patterns being obtained either by means mounted in the receiver itself or by modulating means in the transmitter. When this form of beacon is utilized the carrier may be suppressed before transmission of the beacon signals and the carrier frequency may be radiated simultaneously from the same beacon antenna or from a different antenna to convey other message signals to the pilot of a craft.

According to the features outlined above, it is an object of my invention to reduce the troubles due to scalloping by means of an arrangement radiating a carrier varying of frequency.

It is a still further object of my invention to provide a beacon wherein the frequency is varied and distinction between the radiation patterns is achieved without the use of moving parts.

It is a still further object of my invention to provide a beacon arrangement including a beacon transmitter and a receiver operating to transmit and receive frequency modulated guiding signals.

Other features and objects of my invention will be apparent from the particular description thereof made in connection with the accompanying drawings, in which Fig. 1 illustrates a form of beacon transmitter in accordance with my invention;

Fig. 2 illustrates another radio beacon arrangement constructed in accordance with the features of my invention;

Fig. 3 illustrates one type of band rejection filter suitable for use in beacon arrangements such as shown in Fig. 2;

Fig. 4 is a diagrammatic illustration of curves and signals utilized to explain the features of my invention;

Figure 5:
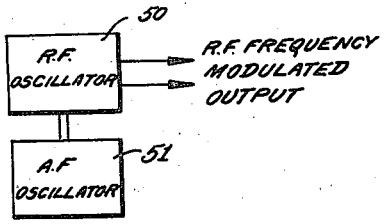
Fig. 5 illustrates one type of arrangement for obtaining a frequency varied carrier wave.

In Fig. 1, 10 represents a source of frequency varied carrier connected over transmission lines 11 and 12 to radiating antennae 13, 14. The carrier frequency from source 10 is varied as to frequency over a given range. For example, the frequency may vary between 99.5 and 100.5 megacycles so as to produce a frequency sweeping over one megacycle of range. Antennae 13, 14 may be of any desired type for producing directive patterns which will overlap in space to form a guiding beacon of the comparison type, along which a craft may follow a line of equipotential to guide it in the desired direction.

In order that the radiation pattern from 13, 14 may be properly distinguished, modulating means such as condensers 15, 16 are provided to impart to the radiated waves amplitude modulations. Condenser 15, 16 are designed to impart different distinctive signal characteristics to the radiated waves and may be driven by a common driving motor 17.

The signals radiated from the beacon may be received on any known type of receiving arrangement used with comparison beacons. For example, the arrangement shown in Fig. 8 may be used. In this figure, antenna 80 is broadly tuned to receive the entire frequency wobbled carrier band. Signals received by antenna 80 are transmitted to receiver 81 where the carrier wave is detected to reproduce the modulation envelope made by condensers 15, 16. The detected signals are separated by filters 82, 83 and the separated signals are compared on an indicating instrument 84. Instrument 84 may be of a type wherein the amplitudes of the signals are directly compared and produce a visual indication. Any other known form of indicator may be used, for example, a tuned reed indicator, or in case the modulation produced by condensers 15, 16 or other modulating means are made in the AN rhythm a pair of simple head phones may be used.

The frequency varied source may be obtained by any known means of frequency modulation. For example, an arrangement such as shown in Fig. 5 may be used wherein the radio frequency oscillator 50 has coupled thereto an audio frequency oscillator 51 in such a manner that the audio frequency will cause a change in the phase of the feedback of oscillator 50, or a variation in the reactance of the oscillating circuit. Other known types of arrangements for obtaining frequency or phase modulation may be equally well utilized for producing the frequency wobbled carrier.

In addition to the known types of modulation such as illustrated in Fig. 1, the frequency wobbled carrier lends itself to an entirely different method of amplitude modulation. Such an arrangement is illustrated in Fig. 2. In this figure, the source of frequency wobbled carrier 20 is coupled over branch transmission lines 21, 22 to separate antennae 23, 24. In line 21 is included a band rejection filter 25 and in line 22 are provided two band rejection filters 26, 27. As the frequency from source 20 varies over its given range rejection filter 25 will cause the waves to drop to substantially zero twice during each cycle. At the same time while the frequency of the carrier is varying over one cycle, the two separate band rejection filters 26, 27 in line 22 will cause the carrier to drop substantially to zero four times during the cycle. Thus a distinctive audio modulation is imparted to the carrier frequency energy radiated from antennae 23, 24 producing signals easily distinguished at the receiver.

A more complete understanding of this phenomenon may be had by reference to curve C of Fig. 4. In this figure the frequency modulated carrier is represented by the curve 40 shown as a straight line frequency variation. It is clear that the same principles apply whether the saw-tooth wave form is used or whether the peaks are rounded. To the right of curve C are shown two rectangles or blocks A, B. Centrally of block A which represents the transmission band over line 21, is shown a dark area 45 corresponding to the band rejection filter 25. The wave 40 is transmitted through line 21 except for the small portion suppressed in area 45. The variation of frequency back and forth over this given range will therefore produce signals as shown at $a$. It can be seen that the signals consist of transmitted energy interrupted twice during each cycle of the frequency modulation of the carrier.

Line 22 is represented by the rectangle B and is provided with two rejection points 46, 47 corresponding to band rejection filters 26, 27 of Fig. 2. These band rejection filters cause an interruption of the transmitted energy four times during each cycle of the frequency modulation, producing a signal such as shown at $b$ of Fig. 4. It can thus be clearly seen that two signals interrupted at different frequencies are produced by the band rejection filters. Any number of band rejection filters may be added to produce a desired modulation frequency of the signals. It is clear that by suitably choosing these filters with respect to the frequency modulation of the carrier band any desired type of signal may be produced. By using wide band rejection filters in the two leads, signals corresponding to dot-dash rhythm or AN rhythm forming an interlocking beacon system may be produced.

Figure 8:
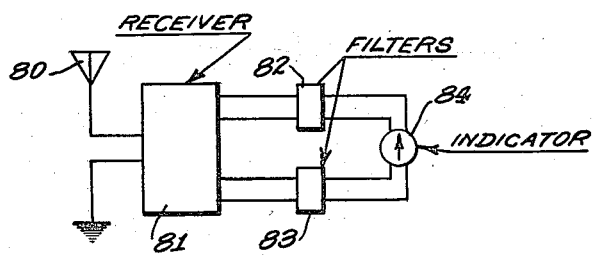
Fig. 8 illustrates a simple form of receiver useful for certain forms of my invention.

Similarly to Fig. 1 the source of frequency varied carrier 20 of Fig. 2 may be produced by an arrangement such as shown in Fig. 5, or by any other known type of arrangement. Likewise, the receiver as shown in Fig. 8 or any other type of receiver may be used with this radio beacon.

Any type of band rejection filter may be used to produce the amplitude modulation in accordance with the showing in Figs. 2 and 4. One form of filter suitable for this purpose may be made in accordance with the teachings of my prior Patent No. 2,159,648 granted May 23, 1939, as illustrated in Fig. 3. According to this arrangement a transmission line 30 has coupled thereto a section of transmission line 31, this transmission line section 31 being mounted adjacent line 30 and loosely coupled thereto. If transmission line section 31 is tuned to the frequency it is desired to attenuate, then section 31 operates to greatly attenuate or substantially block the flow of energy at that particular frequency through line 30. The completeness of the blocking of transmission may be varied to change the depth of modulation. For a more complete discussion of this type of filter arrangement reference may be made to my above mentioned patent.

Figure 6:
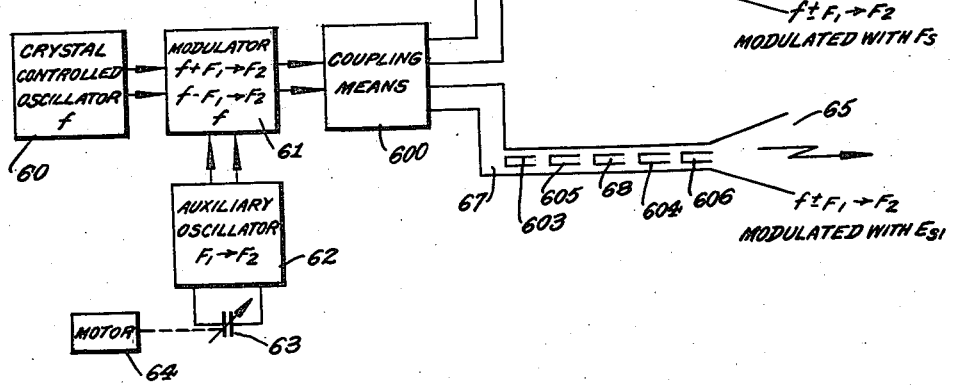
Fig. 6 illustrates another embodiment of my invention using a different arrangement for obtaining an effective frequency variation of the carrier wave in accordance with my invention.

In Fig. 6 is illustrated another embodiment of a beacon arrangement in accordance with my invention. In this arrangement the frequency variation of the carrier is obtained in a different manner from that described above in connection with Fig. 5. The fixed carrier $f$, is obtained from oscillator 60 preferably a crystal controlled oscillator so that the frequency may be maintained within very close limits. Energy derived from 60 is impressed upon modulator 61 and is modulated with energy from auxiliary oscillator 62. Oscillator 62 produces a variable frequency oscillation between the limits $F_1$ and $F_2$. This frequency variation for oscillator 62 may be obtained by means of variable condenser 63 driven by a motor 64. Carrier frequency $f$ from oscillator 60 is then amplitude modulated by the variable frequency from oscillator 62 so as to produce two side bands $f+(F_1 \to F_2)$ and $f-(F_1 \to F_2)$. The carrier frequency $f$ may also be radiated or it may be suppressed as desired. The modulated energy from modulator 61 is then impressed on antennae 64, 65 through a coupling means 600.

If it is desired to suppress the carrier this may be accomplished by providing in each of transmission lines 66, 67 rejection filters 68 of any type, shown as the type of Fig. 3, tuned to suppress the carrier frequency. To provide a distinctive modulation rejection filters 601, 602 are coupled in line 66 at corresponding points in the upper and lower side bands and two pair of rejection filters 603, 604 and 605, 606 corresponding to the upper and lower side bands of the transmitted signal are provided in transmission line 67. The signals radiated from antennae 64, 65 are thus given different characteristic modulations.

The operation of the system in accordance with Fig. 6 may be more clearly seen by reference to Fig. 4, curve D. In this figure curves 40', 40'' illustrate the frequency wobbled carrier produced by the two side bands and, as shown, extend substantially from the carrier frequency to a given distance above and below this carrier frequency, producing a frequency variation of substantially twice the modulation frequency. The transmission bands are illustrated by the rectangles A', B' shown to the right of curves 40', 40''. The black portion 48 in the rectangles represent the rejection filters for suppressing the carrier and the black portions 401, 402 in rectangle A' represent the rejection filters 601, 602 of Fig. 6. It can be seen that the energy represented in curves 40', 40'' will be suppressed at the points indicated by $a_1'$, $a_1''$ to produce a characteristic signal represented by the line $a$. Similarly the rejection filters 403, 404, and 405, 406 produce a reduction of the energy represented by curves 40', 40'' at points intersected by lines $b_1'$ $b_1''$, $b_2'$, $b_2''$ to produce a characteristic signal represented by the line $b$. Because of the double side band arrangement produced by the arrangement shown in Fig. 6, twice as many rejection filters are necessary in the transmission line to produce the same signal effects as are produced when only a single side band is used.

If desired the frequency wobbling arrangement illustrated in Fig. 6 may be utilized in a system such as shown in Figs. 1 and 2, it being necessary only to suppress the carrier and one of the side bands and use the other signal side band as the source of frequency varied carrier.

A receiver arrangement such as shown in Fig. 8 may also be used for receiving signals transmitted from a beacon in accordance with Fig. 6.

In the arrangement of Fig. 6, for example, the carrier frequency $f$ may be made equal to 100 megacycles, the frequency of the auxiliary oscillator 62 may be varied between some low value, for example 500 cycles and one-half a megacycle, so that the total sweep of the frequency radiated from the antennae will be substantially one megacycle in width. If desired the frequency of the auxiliary oscillator may be made to run from zero to one-half a megacycle or more. However, in such a case a more complicated auxiliary oscillating circuit is necessary since such frequency sweep may be suitably obtained only by means of double beat frequency oscillators. Since it is not necessary in accordance with the invention to utilize frequency ranges of such a low value, and furthermore since a sweep from zero up to a higher value will necessarily render the circuit of the receiver more complex, it is preferable to maintain the frequency variation at some intermediate point.

Although I have illustrated one type of arrangement for suppressing the carrier wave when such suppression is desired, it is clear that any of the known means for suppressing the carrier may be used in lieu thereof. For example, the carrier frequency may be suppressed by feeding some of the unmodulated carrier into a stage which carries the modulated carrier in such a manner that it arrives in equal magnitude but in opposite phase and thus cancels out the carrier, leaving only the side bands.

Figure 7:
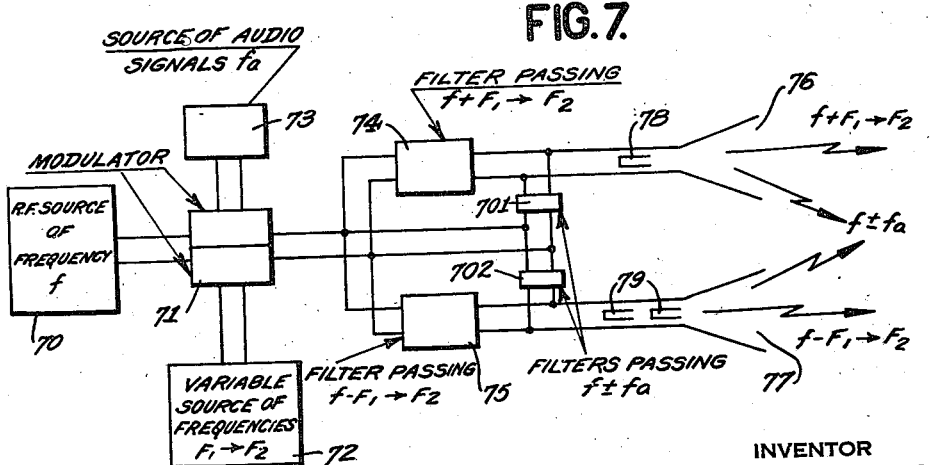
Fig. 7 illustrates still another embodiment of my invention.

A still further embodiment of my invention is illustrated in Fig. 7. In this figure 70 represents a source of radio frequency $f$ which is fed into a modulator 71, where it is modulated by variable frequency signals from auxiliary oscillator 72. However, in this instance the variable frequencies $F_1$, $F_2$ are so chosen as to produce widely spaced side bands when modulated with carrier frequency $f$. The lower portion of modulator 71 may be used for producing these beacon signal modulations. Also associated with modulator 71, I provide a source of audio signals $f_a$, 73. This signal source may be used for the purpose of transmitting other information to pilots flying the beacon produced by the beacon arrangement. Output energy modulated with variable frequencies from source 72 is fed over band pass filters 74, 75 to antennae 76, 77. As illustrated the upper side band $f+F_1 \rightarrow F_2$ is radiated from antenna 76 and the lower side band $f-F_1 \rightarrow F_2$ is radiated from antenna 77. These side bands themselves being separately characterized may be utilized as the beacon signals, the discrimination between the waves being made at the receiver. If desired, however, separate characteristics may be impressed on the signals by use of rejection filters 78, 79, respectively, to differently characterize the signals with separate audio indications.

The additional audio signals from source 73 may also be transmitted from the same antenna to transmit the information along the same course the craft is guided by the beacon signals. This may be accomplished by feeding the modulated energy over filters 701, 702 designed to pass the carrier frequency $f \pm f_a$ and to prevent a cross-connection of the beacon energy between the two antennae. By this arrangement the same carrier frequency may be utilized to transmit both beacon guiding signals and other information signals to the pilot.

In the arrangement of Fig. 7 the variable frequency source may be similar to that disclosed in Fig. 6, differing only in that the lower frequency $F_1$ is of a value sufficient to space the modulated signal a considerable distance from the carrier frequency band. By utilizing this wide spacing the system is more easily separated by filters since it is not necessary to design the filters to discriminate between closely related frequencies. A further advantage resides in the fact that by widely spacing these signals the carrier may be utilized for transmitting other signals.

Figure 9:
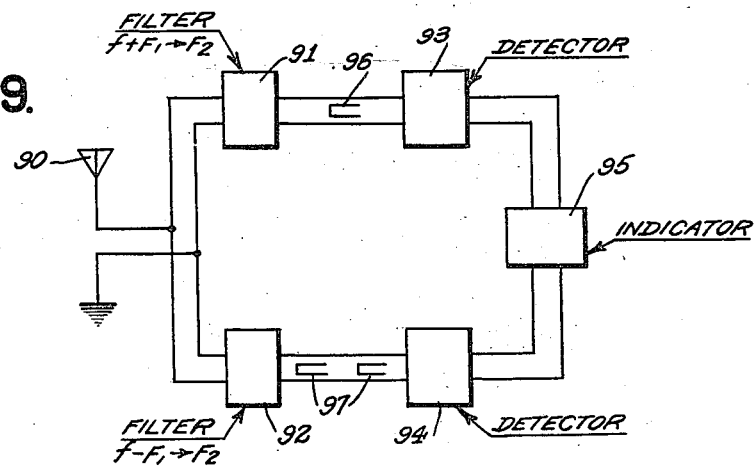
Fig. 9 illustrates another type of receiver useful with certain types of beacons in accordance with my invention.

In Fig. 9 is illustrated a receiver arrangement which may be used for receiving signals from a beacon such as shown in Fig. 7 when the identifying arrangements 78 and 79 are omitted. The beacon signals are received on antenna 90 and the upper and lower side bands of the received waves are separated by filters 91, 92. These separated side bands may then be detected in detectors 93, 94 and the output of these detectors impressed on an indicator 95. Detectors 93, 94 may be rectifiers producing pulsating direct current if desired, so that a direct comparison of the amplitude of the side bands may be made in indicator 95. However, I have also illustrated another means for distinguishing between the side bands. This distinction may be achieved by means of rejection filters 96, 97 arranged in the line connected to detectors 93, 94, respectively, to impart to the received side band different characteristic audio frequency modulation in the same manner as described in connection with the transmitting arrangement. The detectors may then be used to supply differently distinguished signals to indicator 95 which may be of any desired form such as vibrating reed indicators or an audio headphone indicator, or a comparison meter of any known type.

Figure 10:
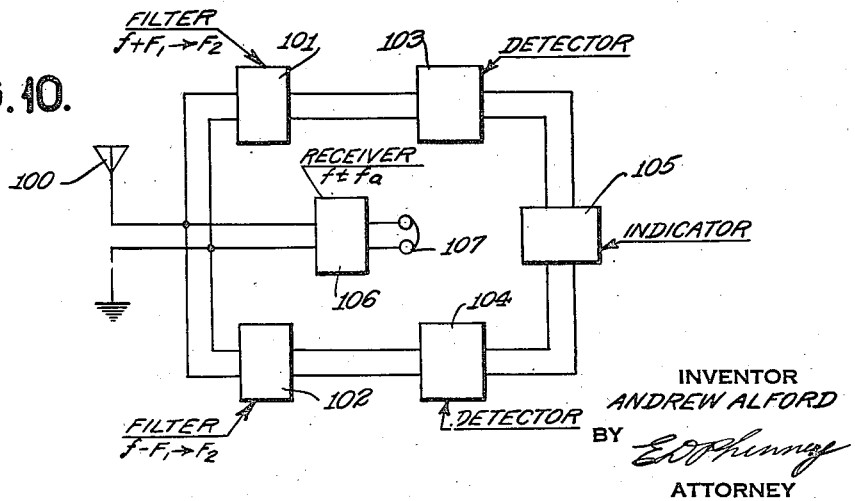
Fig. 10 illustrates one form of receiver arrangement useful with the beacon arrangement illustrated in Fig. 7.

In Fig. 10 I have illustrated another form of receiver suitable for receiving the beacon signals and the other audio signals transmitted from the arrangement disclosed in Fig. 7. In this receiver the signals are received on antenna 100 and the beacon signals are separated by band pass filters 101, 102, detected by detectors 103, 104 and impressed on indicator 105 in the manner described in connection with Fig. 9. Also connected to antenna 100 I provide an additional receiver 106 tuned to the audio modulated signals $f \pm f_a$. The input of receiver 106 may be sharply tuned so as to pass the band represented by the audio frequency but reject the higher side band utilized for the beacon signals. Coupled to the output of receiver 106 are shown a pair of head phones 107 for translating the received audio signals.

While I have described my invention in connection with a few illustrative embodiments thereof, it should be distinctly understood that these are only given by way of illustration of preferred embodiments of my invention and do not constitute a limitation thereof. Further, it is clear that the various embodiments thereof may be modified one with the other by those skilled in the art without departing from the spirit of my invention. What I consider as my invention and upon which I desire to secure protection is embodied in the accompanying claims.

What I claim is:

1. A radio beacon comprising a source of carrier frequency energy of continuously varied frequency, directive radio antennae coupled to said source for radiating said energy to produce overlapping radiation patterns, and means for imparting distinctive characteristics to the energy forming each of said radiation patterns.

2. A radio beacon comprising a source of radio frequency energy of continuously varied frequency, a pair of radiating means, separate lines interconnecting said radiating means and said energy source, and means in each of said lines for producing different characteristic modulating signals in the energy connected to each of said radiating means.

3. A radio beacon comprising a source of radio frequency energy variable over a given frequency band, a pair of directive radiating means for producing overlapping radiation patterns, means for coupling said source to each of said radiating means over separate paths, and frequency rejection means in each said path tuned to reject certain frequencies in said frequency band to produce distinctive modulation characteristics in the radiation patterns of each of said directive radiating means.

4. A radio beacon system comprising a source of radio frequency energy, means for continuously modifying said energy to produce frequency variations between predetermined limits, a pair of directive radiating means for producing overlapping radiation patterns, means for coupling said source separately to each of said radiating means, and means for distinguishing the energy of said radiation patterns from one another.

5. A radio beacon system according to claim 4, wherein said last named means comprises different modulating means in said coupling means to each of said directive radiating means.

6. A radio beacon according to claim 4, wherein said last named means comprises different band rejection filters in each said coupling means.

7. A radio beacon system according to claim 4, wherein said means for modifying said energy comprises a low frequency oscillator for varying the frequency of said source.

8. A radio beacon system according to claim 4, wherein said source comprises a fixed radio frequency oscillator, and said means for modifying said energy comprises an auxiliary oscillator cyclically varied between predetermined limits, and a modulator for modulating said energy with the output from said cyclically variable oscillator.

9. A radio beacon system according to claim 4, wherein said source comprises a fixed radio frequency oscillator, and said means for modifying said energy comprises an auxiliary oscillator cyclically varied between predetermined limits, and a modulator for modulating said energy with the output from said cyclically variable oscillator, said means for coupling including means for transmitting one side band only of said modulated energy to one of said radiating means and for transmitting the other side band only to said other radiating means.

10. A radio beacon system according to claim 4, wherein said source comprises a fixed radio frequency oscillator, and said means for modifying said energy comprises an auxiliary oscillator cyclically varied between predetermined limits, and a modulator for modulating said energy with the output from said cyclically variable oscillator, said means for coupling including means for transmitting one side band only of said modulated energy to one of said radiating means and for transmitting the other side band only to said other radiating means, said means for distinguishing said energy comprising means for receiving said radiated energy, and means for imparting to said received energy distinct characteristics.

11. A radio beacon system according to claim 4, wherein said source comprises a fixed radio frequency oscillator, and said means for modifying said energy comprises an auxiliary oscillator cyclically varied between predetermined limits, and a modulator for modulating said energy with the output from said cyclically variable oscillator, said means for coupling including means for transmitting one side band only of said modulated energy to one of said radiating means and for transmitting the other side band only to said other radiating means, said means for distinguishing said energy comprising means for receiving said radiated energy, means for separating the side bands of said received energy, and means for rectifying said received side bands and applying them to an indicator.

12. A radio beacon system according to claim 4, wherein said source comprises a fixed radio frequency oscillator, and said means for modifying said energy comprises an auxiliary oscillator cyclically varied between predetermined limits, and a modulator for modulating said energy with the output from said cyclically variable oscillator, said means for coupling including means for transmitting one side band only of said modulated energy to one of said radiating means and for transmitting the other side band only to said other radiating means, said means for distinguishing said energy comprising means for receiving said radiated energy, means for separating the side bands comprising said received energy, rejection filters for rejecting different frequencies of each of said separate side bands to produce distinctive audio signal indications, detectors for said distinguished side bands, and an indicator coupled to said detectors.

13. A radio beacon system according to claim 4, wherein said source comprises a fixed radio frequency oscillator, and said means for modifying said energy comprises an auxiliary oscillator cyclically varied between predetermined limits, and a modulator for modulating said energy with the output from said cyclically variable oscillator, means for suppressing the carrier of said modulated waves, said means for coupling including a band pass filter for passing one side band only to each of said radiating means, further comprising means for modulating a part of the output with audio frequency signals, and means for applying said audio frequencies to both said radiating means to transmit said audio frequency signals over the area covered by both said radiation diagrams.

14. A radio beacon system according to claim 4, wherein said source comprises a fixed radio frequency oscillator, and said means for modifying said energy comprises an auxiliary oscillator cyclically varied between predetermined limits, and a modulator for modulating said energy with the output from said cyclically variable oscillator, means for suppressing the carrier of said modulated waves, said means for coupling including a band pass filter for passing one side band only to each of said radiating means, further comprising means for modulating a part of the output with audio frequency signals, means for applying said audio frequencies to both said radiating means to transmit said audio frequency signals over the area covered by both said radiation diagrams, means for receiving both said beacon signals and said radio frequency modulated signals, means for separating and comparing said side bands forming said beacon signals to produce a course indication, and means tuned to receive said audio frequency modulated signals and to reproduce said audio frequency modulations.

15. The method of avoiding difficulties caused by reflection of beacon signals which comprises generating carrier frequency energy of continuously varying frequency, radiating said generated energy to produce overlapping radiation patterns, and producing in each of said radiated patterns distinguishing characteristics, whereby guiding indications substantially free from reflection difficulties are obtained.

16. The method of avoiding difficulties caused by reflection of radiated beacon signals, which comprises generating fixed radio frequency oscillations, amplitude modulating said generated radio frequency oscillations with other variable frequency oscillations to form two side bands of frequency variable energy, and separately radiating said side bands in overlapping relation.

17. The method of avoiding difficulties caused by reflection of radiated beacon signals, which comprises generating fixed radio frequency oscillations, amplitude modulating said generated radio frequency oscillations with other variable frequency oscillations to form two side bands of frequency variable energy, separately radiating said side bands in overlapping relation, receiving said radiated side bands, distinguishing between said received side bands, and producing an indication from said distinguished side bands.

ANDREW ALFORD.